March 27, 1962 C. N. DEVERALL 3,026,690
CONDENSER
Filed April 22, 1960 2 Sheets-Sheet 1
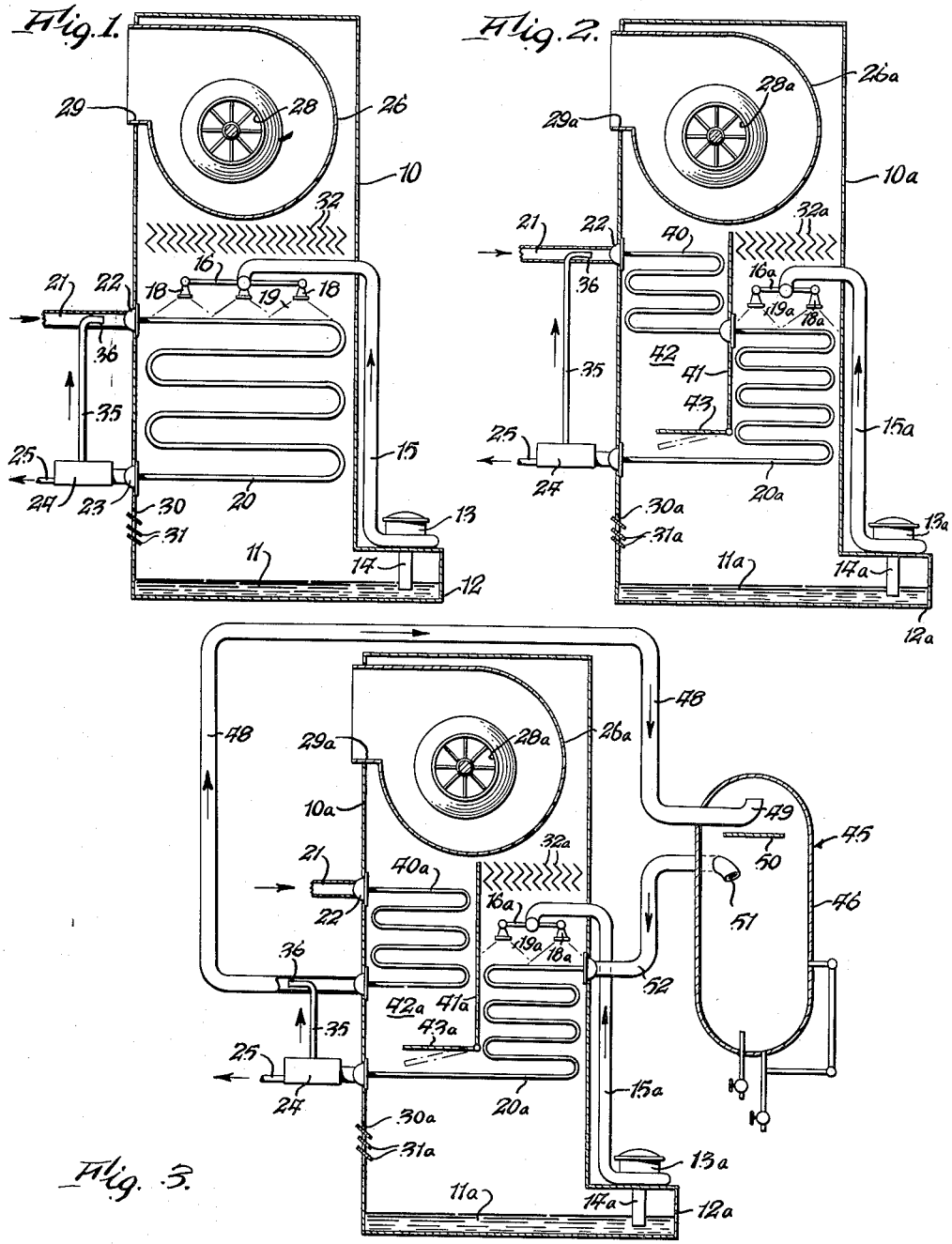
INVENTOR.
Charles N. Deverall
BY
Popp and Sommer
Attorneys

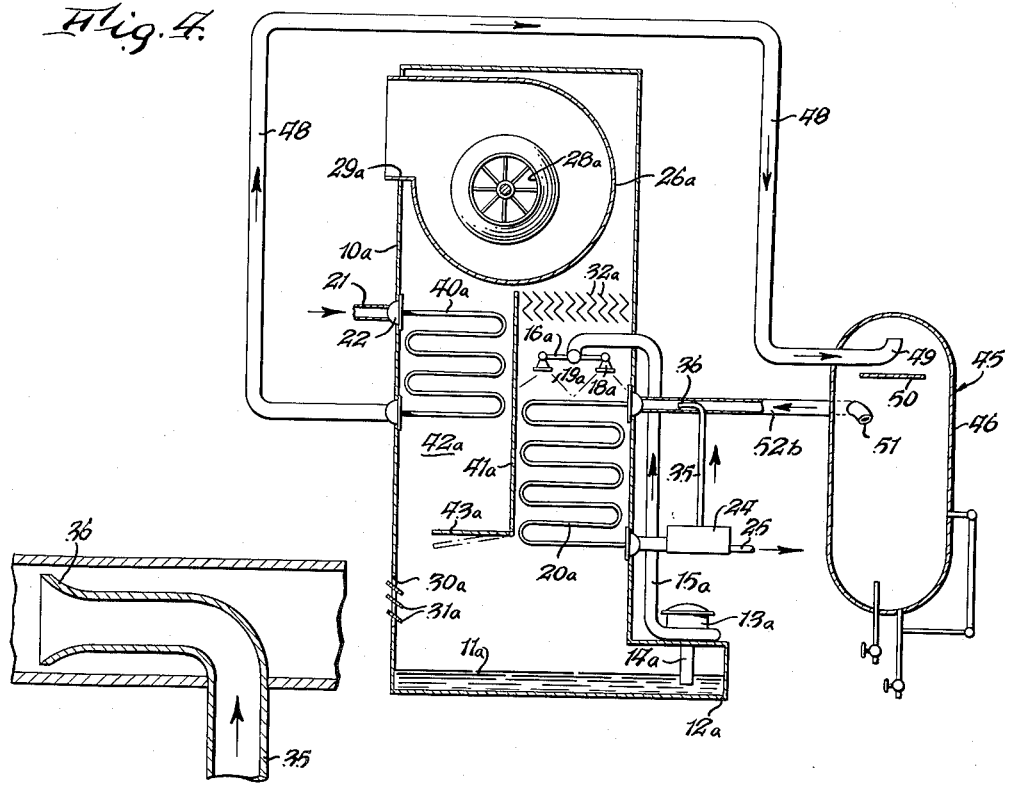
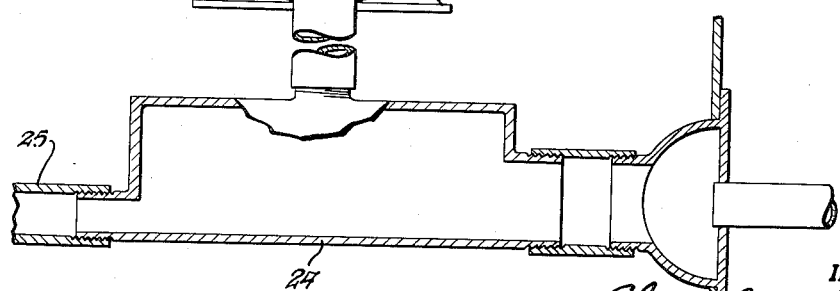

United States Patent Office  3,026,690
Patented Mar. 27, 1962

3,026,690
CONDENSER
Charles N. Deverall, Buffalo, N.Y., assignor to Niagara Blower Company, New York, N.Y., a corporation of New York
Filed Apr. 22, 1960, Ser. No. 23,943
5 Claims. (Cl. 62—305)

This invention relates to a condenser and is more particularly illustrated in the form of an evaporative condenser used in commercial compressor-condenser-evaporator cooling systems, although the invention is applicable to condensers for steam or other vapors or gases and is equally applicable to dry condensers cooled by air or to condensers cooled by any other coolant.

The condenser illustrated comprises a cooling coil composed of sections, each of serpentine form, into one end of which cooling coil the hot compressed refrigerant gas or other vapor or gas to be condensed into a liquid is admitted and from the opposite end of which cooling coil the liquid escapes along the bottom of an over-sized discharge pipe, the upper part of which contains uncondensed gas or vapor. In a dry coil condenser a stream of air is drawn over the exterior of the cooling coil. In an evaporative condenser the exterior of the cooling coil is sprayed with water, and a stream of air is drawn over the exterior so as to provide a thin film of water over the entire external surface of the coil which evaporates moisture directly into the passing air stream. Other coolants are used.

The capacity of such a condenser is, of course, dependent entirely upon the heat transfer value of the coil. The overall heat transfer is a resultant of the combined transfer of the outside surface and the inside surface of the coil. The heat dissipated by the condenser must be conveyed from the gas or vapor to be condensed to the inside surface of the coil. This heat is then transferred through the walls of the tubes and dissipated by heat transfer from the outside surface of the coil. The overall transfer cannot exceed the transfer of the lesser of these two parts of the system, that is, the transfer to the inner surface and the transfer from the outer surface. If less heat is conveyed by the gas or vapor to be condensed to the inner surface of the coil than can be dissipated by the outer surface of the coil, the inside surface heat transfer value will limit the capacity of the coil and of the condenser. Conversely, if more heat is conveyed by the gas or vapor to be condensed to the inner surface of the coil than can be carried away by its outer surface, and the flow of air or water, or other coolant, or both air and water, the outside transfer value will be the limiting factor of the capacity of the coil.

Great capacity should be expected from an evaporative condenser due to the fact that both the inside and outside transfers are latent processes. Thus, in a condenser for refrigerant gases the hot gas at high pressure conveys the heat to the inside surface of the cooling coil and in doing so condenses to a liquid. This heat is dissipated by the latent process of evaporation of the film of water on the outside surface of the cooling coil. It will thus be seen that both processes are latent processes and should, if each is raised to the highest point, give overall transfer of the highest possible value.

A great deal can be and has been done to increase the heat transfer on the outside surface of the tubes of condenser cooling coils. With an evaporative condenser, spraying the outer surface of the coil with water and drawing air over this surface tends to provide a very thin film of water over every inch of outside surface. With both dry, evaporative and other types of condensers the amount of air or other coolant may be increased to almost any desired amount.

If the heat transfer process within the coil of any type of condenser could be speeded up by increase in velocity or elevation of the temperatures of the gas or vapor to be condensed to the point where as much heat is transmitted to the inside surface of the coil as can be carried away by the heat transfer process taking place on the outside surface of the coil, the ultimate capacity of the coil would be obtained. This would represent a striking increase of capacity over present condenser coils.

Unfortunately, with conventional condensers, there are certain limiting factors. In particular there is practically no pressure drop across the condensing coil. It will be found that the head pressure on the gas inlet to the coil and the receiver pressure on the liquid emerging from the coil will be practically the same. The movement of gas through the coil is due almost entirely to the change in volume, which takes place in the condensing process. The pressure differential may, in fact, be reversed, as is the case where the temperature of the room in which the receiver is located is higher than the temperature surrounding the condenser itself. The condenser may be on a roof in zero temperature with the receiver in a basement room having a possible temperature of 100° F.

Attempts have been made to compensate for this condition of a higher pressure at the outlet of a condenser than the head pressure at its inlet by the provision of an equalizer line from the receiver to the inlet of the condenser coil. This however, produces very indifferent results, because as a rule the equalizer lines are not big enough to do the required work under adverse conditions. Also they are usually quite long and are generally broken in at right angles to the hot compressed gas inlet line to the condenser in such a way that the hot gas rushing across the orifice will completely cut off any flow through the equalizer line. Considerable experimental work has been done with these equalizer lines on jobs where they were installed and it is the experience of applicant that opening or closing these equalizer lines made very little difference, if any, in the performance of the condenser.

The evidence is convincing that the capacity of condenser coils is seriously hampered and limited by the sluggish movement of the gas or vapor through the inside of the coils. The only thing that makes the coils operate at all is the fact that the gas enters the coils at high volume, is condensed to liquid of low volume, and the liquid is heavier than the gas. The discharge to the receiver is through a pipe, which is oversized so that both liquid and gas can be present in this pipe and the liquid builds up in the coil to the point of creating enough head to run itself out of the coil into the receiver line. Unfortunately, too, the condenser is usually composed of a great many stands or sections of pipe each of which is a complete serpentine circuit or independent passage. The liquid can hang up in any of these circuits, without interferring with flow in the other circuits, as by the formation of a slug in any one section. Any circuit bottled up by such liquid does not have any flow with the result that no gas passes through this section and no heat transfer takes place. A large proportion of the circuits can be stagnant with resultant greatly decreased capacity of the condenser.

It is the principal object of the present invention to eliminate sluggish flow of the gas or vapor to be condensed through the inside of the cooling coil, thereby both to improve heat transfer to the inside surface of the coil through increased velocity and turbulence, and also to reduce the formation of any stagnant liquid and to rid the various sections of the coil of any slugs of liquid, this being accomplished by forcing the gas through the coil at higher velocity.

Another important object is to reduce to the lowest possible degree the pressure and hence the temperature at the liquid outlet of the coil. The reduction of the pressure will carry a corresponding reduction in liquid temperature. This is one of the purposes of the condenser and one of the functions which produces increased condensing capacity.

It is also an important object of the invention to provide a condenser which not only has increased capacity as compared with present condensers of equal size and rating, but which will also operate at a rated capacity which can be accurately predicted. By actual experience, most complaints concerning condensers are that the condensers fail to meet their rated capacity and it is believed that in most instances this failure is due to sluggish flow of the gas or vapor to be condensed through the cooling coil, especially when accompanied by erratic bottling up of some of the coil sections by slugs of liquid, or otherwise, occasioned by sluggish movement through the coil.

Another important object of the invention is to provide such means for increasing the velocity of the gas or vapor to be condensed through the cooling coil which at no time diminishes the effectiveness of the condenser. Thus while the apparatus embodying the present invention is not needed and probably will be ineffective under very low load conditions, there is no necessity for cutting it out of service since it in no way diminishes the effectiveness of the condenser under such low load conditions.

Another object of the invention is to provide such a means for increasing the velocity of the gas or vapor through the condenser coils which has a very low power requirement and which power requirement is more than compensated for by the increased velocity and hence increased turbulence and increased flow of the refrigerant through the condensing coil.

Another object is to provide apparatus for so increasing the velocity of the gas or vapor through the condenser coil which is not only extremely simple, low in cost and free from service difficulties, but also can be installed in condensers already in service as accessory equipment to achieve the advantages obtained by the practice of the invention.

Other advantages and objects of the invention will be apparent from the following description and drawings in which:

FIG. 1 is a diagrammatic representation of an evaporative condenser embodying the present invention, the representation being in the form of a vertical sectional view.

FIGS. 2, 3 and 4 are similar views of modified forms of evaporative condensers embodying the present invention.

FIG. 5 is a greatly enlarged vertical section through the transfer pipe and a motor driven pump constituting a further modification of the invention, this modification being applicable to any of the forms of the invention shown in FIGS. 1–4.

While the invention is particularly illustrated and described in conjunction with an evaporative condenser for refrigerant gas, the invention is equally applicable to condensers for any other gas or vapor and to condensers in which the coolant is dry air or any other coolant. The invention is shown in FIG. 1 as applied to a simple form of evaporative condenser which is shown as including an upright casing 10 the bottom of which forms a sump for a body of water 11 and this being extended horizontally outward, as indicated at 12, to form a support for a recirculating water pump 13 having its inlet 14 projecting downwardly and submerged in the body of water 11. The outlet line 15 from the pump 13 extends upwardly along the outside of the casing and thence through its side wall to supply water to a spray tree 16 within the upper part of the casing, this spray tree having a plurality of downwardly directed nozzles 18 directing sprays of water 19 downwardly upon a plurality of coil sections 20 contained within the casing, only one being illustrated. These coil sections are arranged side by side in vertical planes and each is of serpentine form being composed of a series of generally horizontal runs connected by return bends.

The hot compressed refrigerant gas or other gas or vapor to be condensed is supplied from a line or pipe 21 to the upper inlet header 22 of the several condenser coil sections 20, and the condensed refrigerant, together with some refrigerant in gaseous form, is received in a lower outlet header 23 which delivers the same to a large pipe section or chamber 24. The condensed refrigerant or condensate passes out through a pipe 25 connected with the bottom of the pipe section 24 to the usual receiver (not shown).

The stream of air required for evaporative cooling of the refrigerant so passing through the coil sections 20 is propelled by a fan or blower 26 arranged in the top of the casing 10 and having its inlet 28 arranged inside of the casing 10 and its outlet 29 discharging exteriorly of the casing. Air is admitted to the casing below the coil 20 through an inlet 30 suitably protected by louvers 31, and entrained water is prevented from entering the fan 26 by the provision of the usual eliminator plates 32 which serve to whip the air leaving the sprays 19 back and forth so as to remove any entrained water therefrom, this water dripping back upon the coil sections 20.

The present invention is directed to increasing the velocity of the refrigerant moving downwardly through the several coil sections 20. To this end a transfer pipe 35 rises from the top of the enlarged pipe section or chamber 24 and communicates with the interior thereof. The upper end of this transfer pipe extends through the bottom of the hot compressed gas inlet pipe 21 of the condenser and connects with a nozzle 36 arranged in this inlet pipe 21. The outlet of this nozzle is directed downstream or toward the inlet header 22 of the condenser coil and is of such form and so arranged that the velocity of the hot compressed refrigerant gas passing around the exterior of the nozzle 36 induce a suction therein thereby to reduce the pressure on the liquid contained within the pipe section or chamber 24 at the outlet of the condenser coil.

When operated under heavy load conditions in condensing hot compressed refrigerant gases, the gases are supplied to the condenser in large volume and pass the nozzle 36 at high velocity, say, in the order of 2800 feet per minute. This velocity is established by the condensation of this hot compressed refrigerant gas in the sections of the condensing coil 20, the reduction in volume being from the assumed 2800 cubic feet per minute to, say, two cubic feet per minute of liquid. With present condensers, however, this velocity of the hot gas entering the condenser coil has no effect in creating any differential between the head pressure of this hot compressed refrigerant gas entering the condensing coil and the receiver pressure on the liquid leaving the condensing coil, the refrigerant pressure at the inlet and outlet of the condensing coil being substantially the same under all operating conditions and the flow of refrigerant through the coils and out of the condenser resulting essentially from the gravitational flow of the liquid refrigerant or condensate down the cooling coil sections 20 and the building up of a head of liquid in these sections or the outlet header 23. Accordingly, with condensers as now made there is little to inhibit the formation of slugs of liquid in any of the coil sections 20 and which travel slowly down the section under gravitational influence alone, and bottle up that section until entering the outlet header 23. While this condition exists the bottled up section is wholly useless and the capacity of the condenser is reduced accordingly.

However, with the practice of the present invention the hot refrigerant gases passing the downstream opening outlet of the nozzle 36 at the assumed high velocity of 2800 cubic feet per minute induce a pronounced suction in this nozzle and which creates a pressure differential between the refrigerant entering and leaving the condensing coil sections 20. Accordingly the refrigerant in the coil is propelled therethrough at a velocity increased by this pressure differential as compared by the sluggish action of gravity acting alone upon the condensate. As a result slugs of liquid will not tend to form in any of the coil sections 20 and if they do form are propelled through the coil sections at the increased velocity provided by the pressure differential established by the nozzle 36.

In providing a pressure differential between the inlet and outlet of the condensing coil 20, the nozzle 36 also, of course, reduces the pressure at the liquid outlet of the coil. This reduction in pressure will carry a corresponding reduction in liquid temperature of the leaving condensate. This is one of the purposes and objectives of a condensing coil and one of the factors which produces condensing capacity. For instance, in a 350 ton evaporative condenser, a reduction of 5° F. in the liquid temperature leaving the coil under a 95° F. dry bulb and 75° F. wet bulb ambient operating condition will increase the capacity of the condenser by about 100 tons in 350 tons.

In FIG. 2 is illustrated the applicability of the invention to an evaporative cooler having a precooling coil 40 in advance of the wetted or evaporative cooling coil. The dry precooling coil 40 is arranged in the same casing and alongside the wetted coil and is isolated from the sprays by a vertical partition 41 which provides a dry air pass 42 alongside the spray chamber and which dry air pass is serviced by the same fan as that which draws the air through the spray chamber and past the wetted coil. The proportion of air supplied to the dry air pass 42 can be regulated by a damper 43. Since in other respects the components of the cooling coil, casing, spray system and air system are similar to and function the same as the corresponding components in the form of the invention shown in FIG. 1, the same reference numerals have been employed and distinguished by the suffix "a."

The function of the dry precooling coil 40 in the form of the invention shown in FIG. 2 is to reduce the temperature of the hot compressed refrigerant gas supplied from the line 21 to such low value as will tend to avoid scale formation from the thin film of spray water on the wetted coils 20a.

As with the form of the invention shown in FIG. 1 the enlarged pipe section or chamber 24 is arranged in the outlet line from the condensing coil and uncondensed refrigerant gas from the top of this enlarged pipe section or chamber is drawn up the pipe 35 by the nozzle 36 the outlet of which is in the path of the hot refrigerant gas entering the condenser through the pipe 21 and is directed downstream. As with the form of the invention shown in FIG. 1, the high velocity of the entering hot compressed refrigerant gas creates a substantial pressure differential between the inlet and outlet sides of the wetted condenser coil 20a, thereby to effect a positive propulsion of the refrigerant therethrough.

In FIG. 3 is illustrated a further modification of the invention, similar to that shown in FIG. 2, with the addition of an oil separator 45 between the air cooled precooling coil and the wetted coil to remove oil condensed from the refrigerant gas on passing through the precooling coil. This oil separator is shown as being in the form of an enclosed, vertical, cylindrical body 46 supplied with the precooled refrigerant gas by a line 48 which connects with the outlet of the precooling coil. This pipe 48 extends through the top of the shell 46 and has a discharge 49 directing the refrigerant gas upwardly against the top of the shell. A horizontal partition 50 is arranged under the discharge 49 and the precooled refrigerant gas, from which entrained condensed oil has been separated by the reduction in velocity and long path traversed in the shell 46, escapes through a downwardly and tangentially arranged outlet 51 which is connected by a line 52 with the inlet of the wetted condensing coil. Since in other respects the components are similar to and function in the same manner as the corresponding components in the form of the invention shown in FIG. 2, the same reference numerals have been employed.

With the form of the invention shown in FIG. 3, the precooled refrigerant gas passing through the pipe 48 at high velocity from the precooling coil 40a to the oil separator 45, acting against the nozzle 36, with its outlet opening directed downstream, creates a suction in the transfer pipe 35 and enlarged pipe section or chamber 24 thereby to establish a pressure differential at opposite sides of the wetted condenser coil 20a which pressure differention produces a positive velocity in the refrigerant passing through this wetted coil 20a thereby to avoid both sluggish movement of the refrigerant through the wetted coil and also to avoid the formation of the slugs of liquid refrigerant in any of the sections of this coil as would bottle off such sections.

The form of the invention shown in FIG. 4 is identical to the form of the invention shown in FIG. 3 except that the venturi nozzle 36 is arranged in the pipe 52b between the oil separator 45 and the wetted coil 20a rather than in the pipe 48 between this oil separator and the precooling coil 40a as with the form of the invention shown in FIG. 3. The pipe 52b corresponds to the pipe 52 of the form of the invention shown in FIG. 3. Since in other respects the construction and functioning of the parts is identical to that shown in FIG. 3 the same reference numerals have been employed and a detailed description of operation is not repeated.

If for any purpose additional velocity of the refrigerant passing through the wetted coil should be desirable, as compared with that capable of being produced by the venturi nozzle 36 alone, such additional velocity can be produced by a motor driven pump 55 arranged in the line 35 connecting the inlet and outlet sides of the condensing coil. This modification of the invention is illustrated in FIG. 5 and in this form of the invention the nozzle 36 with its outlet opening directed downstream is also preferably retained so that both the suction effect of the high velocity refrigerant gases entering the system and also the motor driven pump 55 arranged in the line 35 connecting the inlet and outlet sides of the condensing coil. This modification of the invention is illustrated in FIG. 5 and in this form of the invention nozzle 36 with its outlet opening directed downstream is also preferably retained so that both the suction effect of the high velocity refrigerant gases entering the system and also the motor driven pump 55 are utilized to obtain the desired increase in velocity of the refrigerant through the wetted coil. Obviously the modified form of the invention illustrated in FIG. 5 can be adapted to any of the forms of the invention shown in FIGS. 1–4 by the simple expedient of adding the motor driven pump 55 in the transfer line 35.

It will particularly be noted that with the motor driven pump 55 almost any pressure differential can be created between the inlet and outlet of the condensing coil, thereby lowering the pressure and temperature of the condensate leaving the coil to any desired value. As previously indicated, an increased condensing capacity so that the use of the motor driven pump 55 can be employed to increase the capacity of the condenser.

If the nozzle 36, alone or in combination with the motor driven pump 55, should draw some liquid from the outlet of the condenser and return it for repassage through the condenser coil, any subcooling of such liquid would not be a disadvantage, nor would the capacity of the coil be adversely affected by the presence of such liquid even if it did not flash on encountering the hot compressed refrigerant gas being supplied.

From the foregoing it will be seen that the present invention provides a very simple and effective way of increasing, in any type of condenser, the velocity of the gas or vapor to be condensed passing through a condensing coil both to improve the heat transfer characteristic by virtue of such increased velocity and the turbulence resulting therefrom and also to avoid the formation of slugs of liquid which bottle off and render inoperative the coil sections in which they form. If such sections do from the pressure differential provided by the present invention tends to move such slugs more rapidly along the affected coil sections thereby to return these coil sections to service in a shorter time. It will also be seen that in its preferred form the invention is extremely simple, it is free from servicing difficulties and while not operative under very light load conditions will not impair the operation of the condenser under such light load conditions so that it is not required to be cut out of service at any time. It will also be seen that by the provision of a pressure differential at the inlet and outlet of the condenser, the performance of the coil is improved so that the condenser will have a higher capacity. Also by the provision of such a pressure differential the behaviour of the coil is rendered more constant so that the coil will live up to its rated capacity and be free from the erratic characteristics which have proved to be so troublesome with present condensers in obtaining the rated capacity under high load conditions at all times. Also, with or without the use of the pump 55, a lower pressure at the liquid outlet of the coil is obtained, thereby to provide a lower temperature of the leaving condensate and increased capacity.

I claim:

1. In a condenser for compressed gas or vapor having a plurality of upright coil sections arranged side by side, an inlet pipe supplying said compressed gas to the upper ends of said upright coil sections, an outlet pipe adjacent the lower outlet ends of said upright coil sections for the escape of condensate therefrom, and means moving a stream of coolant over the exterior of said upright coil sections; the combination therewith of means propelling said gas and any condensate downwardly through said upright coil sections and producing a lower pressure in said outlet pipe than the head pressure in said inlet pipe, comprising gas separating means connecting the lower ends of said upright coil sections with said outlet pipe and separating uncondensed gas from the condensate escaping through said outlet pipe, an upright transfer pipe connected at its lower end to said separating means and arranged to withdraw uncondensed gas therefrom and connected at its upper end with said compressed gas or inlet line, and means connected with said transfer pipe and producing a pressure differential at opposite ends of said transfer pipe.

2. The combination set forth in claim 1 wherein said means providing said pressure differential comprises an outlet of said transfer pipe so arranged in said compressed gas inlet pipe that the passing compressed gas creates a suction in the upper end of said transfer pipe which in turn provides a pressure differential between the upper and lower ends of said upright coil sections.

3. The combination set forth in claim 2 wherein said coolant is air, and means are provided for discharging water to wash the exterior of said upright coil sections to evaporate thereon into said air stream and extract heat from said coil sections, and wherein an air cooled precooling coil is arranged in advance of said upright coil sections and upstream from said upper end of said transfer pipe to reduce the temperature of the compressed gas entering the upright coil sections.

4. The combination set forth in claim 1 wherein said means providing said pressure differential comprises a motor driven pump in said upright transfer line.

5. The combination set forth in claim 4 wherein said coolant is air, and means are provided for discharging water to wash the exterior of said upright coil sections to evaporate thereon into said air stream and extract heat from said coil sections, and wherein an air cooled precooling coil is arranged in advance of said upright coil sections and upstream from said upper end of said transfer pipe to reduce the temperature of the compressed gas entering the upright coil sections.

References Cited in the file of this patent

UNITED STATES PATENTS

| | | |
|---|---|---|
| 1,234,639 | Shipley | July 24, 1917 |
| 2,166,397 | Deverall | July 18, 1939 |
| 2,292,259 | Zwickl | Aug. 4, 1942 |
| 2,504,149 | Olsted | Apr. 18, 1950 |